United States Patent [19]
Linzer

[11] Patent Number: 5,905,542
[45] Date of Patent: May 18, 1999

[54] SIMPLIFIED DUAL PRIME VIDEO MOTION ESTIMATION

[75] Inventor: Elliot N. Linzer, Bronx, N.Y.

[73] Assignee: C-Cube Microsystems, Inc., Milpitas, Calif.

[21] Appl. No.: 08/753,963

[22] Filed: Dec. 4, 1996

[51] Int. Cl.⁶ ...................................... H04N 7/32

[52] U.S. Cl. .......................... 348/699; 348/416; 348/402; 348/407; 348/413

[58] Field of Search ...................... 348/402, 407, 348/413, 416, 699, 409, 411–412; 386/33, 109, 111; 382/236, 238, 244

[56] References Cited

U.S. PATENT DOCUMENTS

| | | | |
|---|---|---|---|
| 5,619,268 | 4/1997 | Kobayashi et al. | 348/416 |
| 5,715,008 | 2/1998 | Sekiguchi et al. | 348/416 |
| 5,737,022 | 4/1998 | Yamaguchi et al. | 348/416 |
| 5,737,023 | 4/1998 | Linzer | 348/416 |
| 5,745,183 | 4/1998 | Lam | 348/416 |
| 5,748,240 | 5/1998 | Carr et al. | 348/384 |
| 5,768,537 | 6/1998 | Butter et al. | 348/416 |

FOREIGN PATENT DOCUMENTS 408182000  7/1996  Japan ................ H04N 7/32

OTHER PUBLICATIONS

SGS–Thomson Microelectronics, STI3500A, MPEG–2/CCIR 601 Video Decoder, section 1.2.4, pp. 8–9 Jul. 1994.
Ishihara et al, "A Half–pel Precision MPEG2 Motion–Estimation Processor with Concurrent Three–Vector Search", IEEE Journal of Solid–State Circuits, vol. 30, No. 12, pp. 1502–1509, Dec. 1995.

*Primary Examiner*—Howard Britton
*Assistant Examiner*—Vu Le
*Attorney, Agent, or Firm*—Proskauer Rose LLP

[57] ABSTRACT

Methods and apparatus for performing dual prime motion estimation on video fields or frames of a video signal. A 16×16 motion estimator generates a same-parity match vector M_SP and an opposite-parity match vector M_OP for a current macroblock of a current field using a reference macroblock from each of a previous same-parity and opposite-parity field. A dual prime motion estimator receives the M_SP and M_OP match vectors for the current macroblock, and generates a base motion vector MV and a delta motion vector DMV for the current macroblock. In a first embodiment, the dual prime motion estimator generates MV and DMV by setting MV equal to M_SP and then selecting DMV such that the opposite-parity vector OPV to be computed by a decoder is as close as possible to M_OP. In a second embodiment, OPV is set equal to M_OP and MV and DMV are selected such that MV is as close as possible to the same-parity match vector M_SP. In a third embodiment, the dual prime motion estimator uses error measurements between the current macroblock and the same-parity and opposite-parity macroblocks to determine whether the techniques of the first embodiment or the second embodiment should be applied to the current macroblock.

39 Claims, 3 Drawing Sheets

SIMPLIFIED DUAL PRIME VIDEO MOTION ESTIMATION

FIELD OF THE INVENTION

The present invention relates generally to digital video compression and more particularly to dual prime motion estimation techniques for use in digital video compression.

BACKGROUND OF THE INVENTION

A video frame sequence may be converted into a compressed digital video bit stream in accordance with the MPEG-2 standard as described in greater detail in ISO/IEC DIS 13818-2, "Generic Coding of Moving Pictures and Associated Audio: Video," which is incorporated by reference herein. A given video frame is made up of a plurality of macroblocks, with each macroblock including one 16×16 block of luminance samples and either two 8×8 blocks of chroma samples (4:2:0 format) or one 16×16 block of chroma samples (4:2:2 format). An interlaced frame includes a top or even field and a bottom or odd field. The top and bottom fields represent alternating scan lines of the interlaced frame and therefore correspond to different instances in time. Each frame may be encoded as a single "frame picture" or a pair of "field pictures." A forward-only predictive (P) field picture may be predicted from the last two reference fields that occur temporally before the P field picture in the video sequence being compressed. These reference fields may be encoded as field pictures or as parts of frame pictures.

Figure 1:
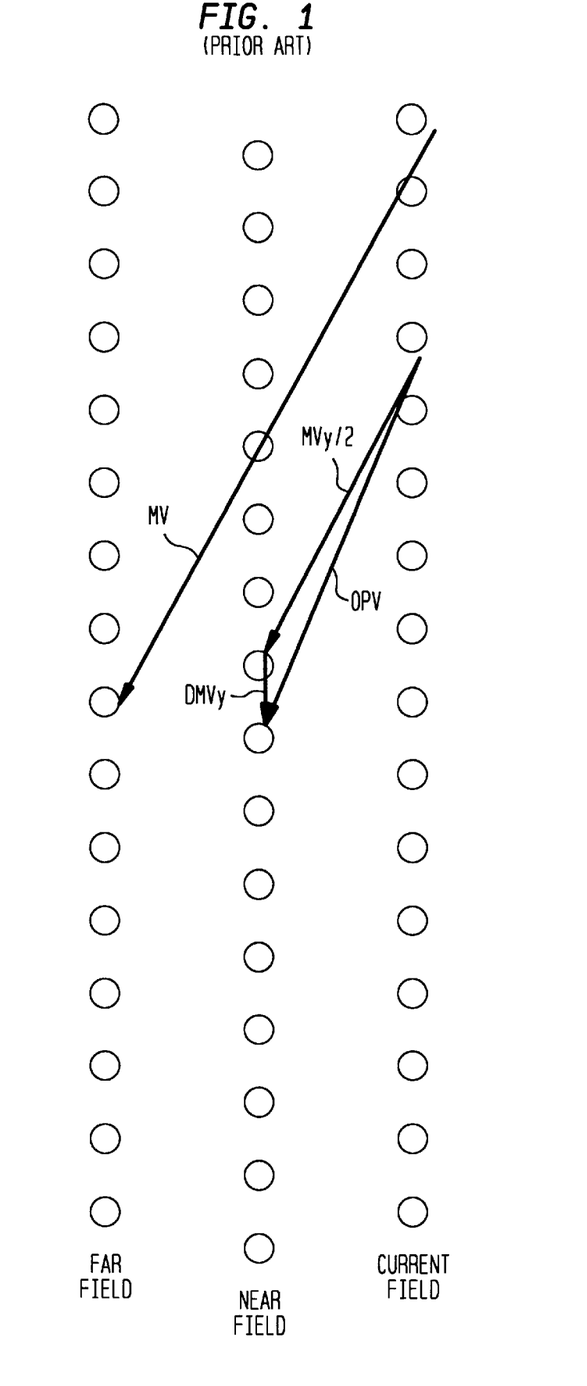
FIG. 1 illustrates a conventional dual prime motion compensation technique applied to vertical components of a current field, near field and far field macroblock.

Dual prime motion estimation is a video compression technique suitable for use with interlaced P field pictures. The dual prime technique may be used if the P field picture is in a frame that is to be displayed immediately after a reference frame. The reference frame may be an intra-coded (I) or P frame picture or a pair of fields. A given P field picture using dual prime motion estimation is predicted from the two fields that are displayed just before the given P field picture. These two fields are referred to herein as the same-parity or far field and the opposite-parity or near field. For a given macroblock, a video encoder inserts in the compressed bit stream a base motion vector MV with x and y components (MVx, MVy) and a delta motion vector DMV with x and y components (DMVx, DMVy). Both of these motion vectors are in half-pel units, and each x and y component of DMV must be in the set $\{-1, 0, 1\}$. A decoder receiving the compressed video bit stream uses the MV and DMV vectors to compute an opposite-parity vector OPV having x and y components (OPVx, OPVy) in accordance with the following equations:

$$OPVx = MVx/2 + DMVx \quad \text{Equation (1)}$$

$$OPVy = MVy/2 + DMVy + e \quad \text{Equation (2)}$$

where e is equal to $-1$ if the current field is a top field and $+1$ if the current field is a bottom field, and the operator "/" as used herein means divide and round toward zero. FIG. 1 shows the generation of the vertical or y component of OPV in accordance with Equation (2) above, with OPVy being formed as the sum of MVy/2, DMVy and e. The MV and OPV vectors are used in conjunction with the above-noted prediction error macroblock to generate macroblocks formed from the far field and near field, respectively. These two macroblocks are then pointwise averaged to form a predicted macroblock for the current field. As with other forms of motion estimation, the decoder adds the predicted macroblock to the macroblock output of an inverse discrete cosine transform (IDCT) circuit to form a reconstructed macroblock for the current field.

An encoder should choose the MV and DMV vectors such that MV and OPV describe well the translation of the current macroblock from the previous same-parity and opposite-parity fields. This will ensure that the predicted macroblock will be a near match of the current macroblock, so only a relatively small number of bits need to be used to encode DCT coefficients that, when added to the predicted macroblock, will give a very good reconstruction of the current macroblock. One approach an encoder may take is to consider pairs of MV and DMV vectors, compute the predicted macroblock that each pair would generate, and choose the pair with the best predicted macroblock. Such an approach is used, for example, in the MPEG-2 Test Model 5. A problem with this approach is that it is "expensive" computationally in that many pairs of vectors generally must be considered (e.g., 9 for each MV) and each comparison requires the pointwise averaging of two macroblocks. A possible alternative approach simplifies the estimation process by selecting DMV as zero or another predetermined value, but can lead to a substantial degradation in decoded video quality.

As is apparent from the above, there is a need for an improved dual prime motion estimation technique which reduces motion vector search requirements and encoder complexity while maintaining a desired level of video quality.

SUMMARY OF THE INVENTION

The present invention provides an apparatus and method for performing dual prime motion estimation in a video compression system. The invention provides simplified dual prime motion estimation with substantially reduced motion vector search requirements.

A first exemplary embodiment of the invention provides a dual prime motion estimator which receives a same-parity best match motion vector M_SP and an opposite-parity best match motion vector M_OP for a given macroblock of a current field. A base motion vector MV and a delta motion vector DMV are then selected such that the base motion vector MV is equal to the same-parity match vector M_SP, and an opposite-parity vector OPV to be generated by a decoder is as close as possible to the opposite-parity match vector M_OP given that the base motion vector MV is set equal to M_SP, each component of the delta motion vector DMV is from the set $\{-1, 0, 1\}$, and the OPV components are computed in accordance with Equations (1) and (2) above.

A second exemplary embodiment of the invention provides a dual prime motion estimator which also receives a same-parity best match motion vector M_SP and an opposite-parity best match motion vector M_OP for a given macroblock of a current field. A base motion vector MV and a delta motion vector DMV are then selected such that an opposite-parity vector OPV is set equal to the opposite-parity match vector M_OP, and each component of the base motion vector MV is as close as possible to the same-parity match vector M_SP given that the opposite-parity vector OPV is set equal to M_OP, each component of the delta motion vector DMV is from the set $\{-1, 0, 1\}$, and the opposite parity vector OPV is computed from the base motion vector MV and the delta motion vector DMV in accordance with Equations (1) and (2) above.

A third exemplary embodiment of the invention provides a dual prime motion estimator which determines E_SP as a measure of the error between the current macroblock and the reference macroblock of the same-parity previous field used to generate M_SP, and determines E_OP as a measure of the error between the current macroblock and the reference macroblock of the opposite-parity previous field used to generate M_OP. If E_OP is greater than E_SP plus a constant, the dual prime motion estimator applies the technique of the first embodiment described above to compute MV and DMV. Otherwise, the dual prime motion estimator applies the technique of the second embodiment described above.

In each of the above embodiments, there is no need to compute predicted macroblocks that would be generated by pairs of base and delta motion vectors, as required by some prior art motion estimators. The base and delta motion vectors are computed as by-products of the best match same-parity and opposite-parity motion vectors. These best match motion vectors may be computed in an encoder that can also use motion compensation modes other than dual prime. Each of the above embodiments simplifies the dual prime motion estimation process relative to prior art techniques, thereby reducing encoder cost and complexity. Moreover, the simplification is provided without any significant degradation in video quality. These and other features and advantages of the present invention will become more apparent from the accompanying drawings and the following detailed description.

DETAILED DESCRIPTION OF THE INVENTION

The present invention is illustrated herein using exemplary dual prime motion estimators suitable for use in am MPEG-2 video compression system. It should be understood that the techniques of the present invention are more broadly applicable to any system in which it is desirable to perform dual prime motion estimation or other similar types of motion estimation. For example, the invention is suitable for use with the video encoding standards other than MPEG-2, and is suitable for encoding both field pictures and frame pictures. The term "dual prime" as used herein is therefore intended to include any type of motion estimation technique which generates multiple motion vectors for a given macroblock of a field picture or a frame picture. The term "best match" in the context of same-parity and opposite-parity best match motion vectors M_SP and M_OP is intended to include not only the literal best match but also any match of sufficient quality to be useful in given application.

Figure 2:
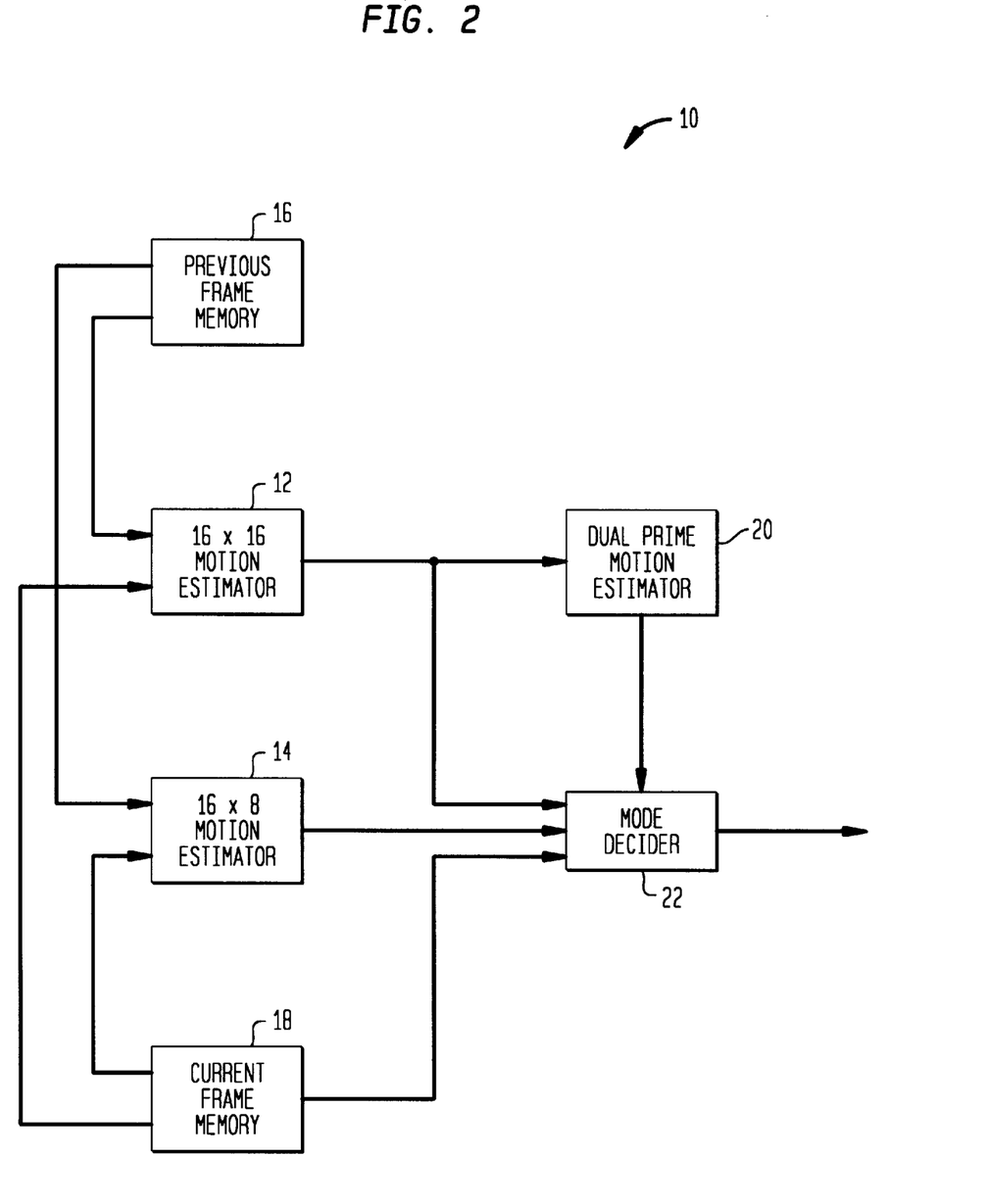
FIG. 2 is a block diagram of a portion of an exemplary video compression system in accordance with the present invention.
Figure 3:
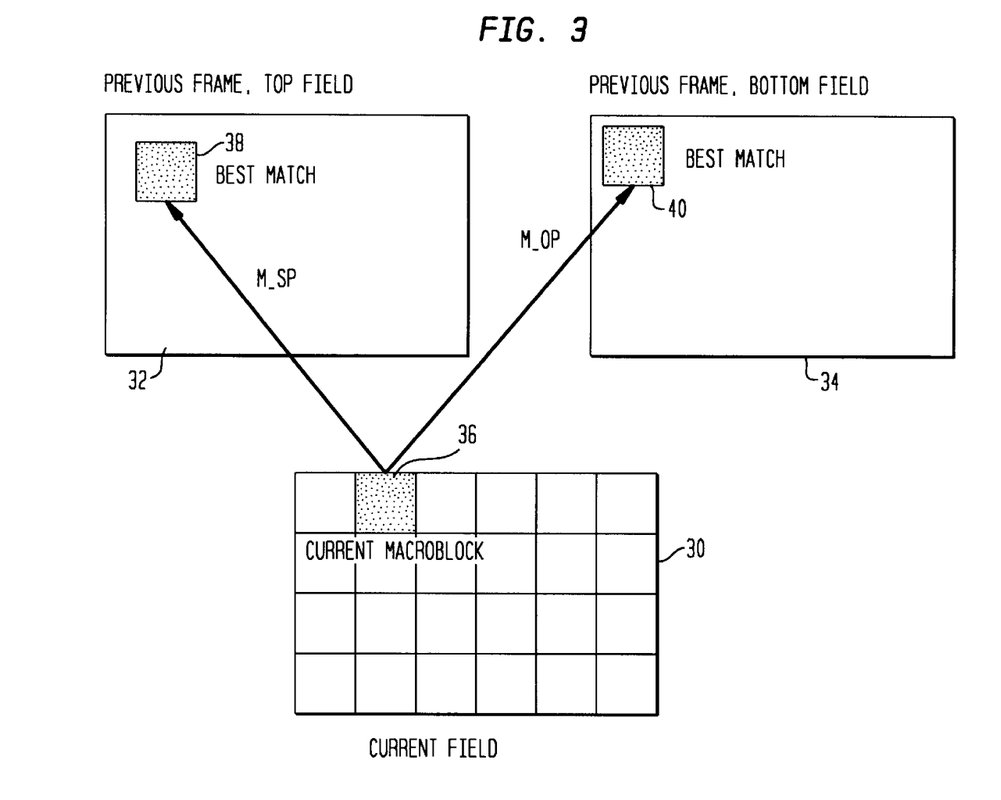
FIG. 3 illustrates the generation of same-parity and opposite-parity match vectors M_SP and M_OP in the 16×16 motion estimator of FIG. 2.

FIG. 2 shows a portion of an exemplary video compression system 10 in accordance with the invention. The system includes a 16×16 motion estimator 12 which generates same-parity and opposite-parity match vectors based on 16×16 macroblocks of a video sequence to be encoded. FIG. 3 illustrates the generation of a same-parity best match motion vector M_SP and an opposite parity best match motion vector M_OP for a current macroblock 36 of a current field 30. Assuming, for example, that the current field 30 is a top field of a video frame, the same-parity match vector M_SP indicates a translation between the current macroblock 36 and a best matching macroblock 38 in the top field 32 of a previous frame. The opposite-parity match vector M_OP indicates a translation between the current macroblock 36 and a best matching macroblock 40 in the bottom field 34 of the previous frame. The 16×16 motion estimator 12 computes the M_SP and M_OP vectors for each of the macroblocks of the current field 30. The system 10 also includes a 16×8 motion estimator 14 which generates conventional motion vectors for the top and bottom 16×8 halves of each macroblock being encoded. The previous frame macroblock data are supplied to the 16×16 and 16×8 motion estimators from a previous frame memory 16. The current field macroblock data are supplied to the 16×16 and 16×8 motion estimators from a current frame memory 18.

The system 10 further includes a dual prime motion estimator 20 which receives the M_SP and M_OP match vectors from the 16×16 motion estimator 12 and generates base (MV) and delta (DMV) motion vectors for the corresponding macroblock. The dual prime motion estimator 20 supplies the MV and DMV motion vectors to a mode decider 22 which also receives the M_SP and M_OP match vectors from the 16×16 motion estimator 12 and the motion vectors generated by the 16×8 motion estimator 14. The mode decider 22 determines whether the encoding mode for a given macroblock or group of macroblocks will be a 16×16 mode, a 16×8 mode or a dual prime mode. The mode decider 22 then supplies the vectors corresponding to the selected mode to subsequent encoding circuitry. Alternative compression systems may eliminate the 16×8 motion estimator 14, such that the mode decider 22 receives only the M_SP, M_OP, MV and DMV vectors for a given macroblock.

Figure 4:
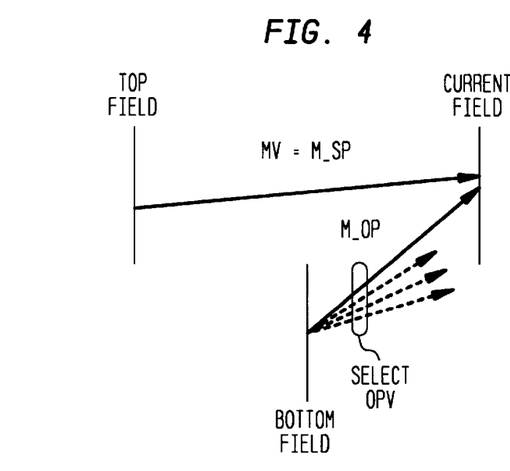
FIG. 4 illustrates dual prime motion estimation in accordance with a first exemplary embodiment of the invention.

FIG. 4 illustrates the operation of a first exemplary embodiment of the dual prime motion estimator 20 in accordance with the present invention. The base motion vector MV for a given macroblock of the current field is chosen as the same-parity match vector M_SP. The delta motion vector DMV is then chosen so that the opposite-parity vector OPV to be computed by the decoder is as close as possible to the opposite-parity match vector M_OP given that MV is selected as M_SP and the x and y components of DMV are selected from {−1, 0, 1}. The DMV vector is therefore determined such that the resulting OPV vector is selected from a group of potential OPV vectors shown generally by dashed arrows in FIG. 4. Each of the dashed arrows indicates a potential OPV vector that would be obtained using a particular choice of DMV given that MV is set to M_SP. The determination of the DMV vector thus depends on a comparison of the various OPV vectors which may be generated in accordance with Equations (1) and (2) above using the DMV component values of {−1, 0, 1} given that MV is selected as M_SP.

The following example illustrates the operation of the dual prime motion estimator 20 in accordance with the first exemplary embodiment of the present invention. The same-parity match vector M_SP, opposite-parity match vector M_OP and e values are given by: M_SP=(7, 4), M_OP=(4,1) and e=1. As described above, the motion estimator 20 sets MV=M_SP=(7, 4). Nine potential DMVs are considered, which produce nine potential OPVs as follows:

| Potential DMV | Potential OPV |
|---|---|
| (−1, −1) | (2, 2) |
| (−1, 0) | (2, 3) |
| (−1, 1) | (2, 4) |
| (0, −1) | (3, 2) |
| (0, 0) | (3, 3) |
| (0, 1) | (3, 4) |
| (1, −1) | (4, 2) |
| (1, 0) | (4, 3) |
| (1, 1) | (4, 4) |

The potential OPV that is closest to the M_OP value of (4, 1) is (4, 2), which is generated by using DMV =(1, −1). Although this example illustrates the operation of the first embodiment of the present invention by examining all possible values of DMV, all possible values of DMV do not have to be examined explicitly to determine which produces an OPV as close as possible to M_OP given that MV is set equal to M_SP and each component of DMV is in the set {−1, 0, 1}. Instead, the appropriate DMV value can be computed in the manner described below.

The following pseudocode illustrates the generation of the MV and DMV motion vectors for a given macroblock in the first exemplary embodiment of the dual prime motion estimator 20:

MV=M_SP

If (*M_OPx*>*MVx*/2) DMVx=1 else if (*M_OPx*<*MVx*/2) DMVx=−1 else DMVx=0

If (*M_OPy*>*MVy*/2+*e*) DMVy=1 else if (*M_OPy*<*MVy*/2+*e*) DMVy=−1 else DMVy=0

Applying this pseudocode to the previous example, in which M_SP =(7, 4), M_OP=(4, 1) and e=1, it can be seen that M_OPx>MVx/2, so DMVx is chosen as 1. Also, M_OPy<MVy/2+e, so DMVy is chosen as −1.

Figure 5:
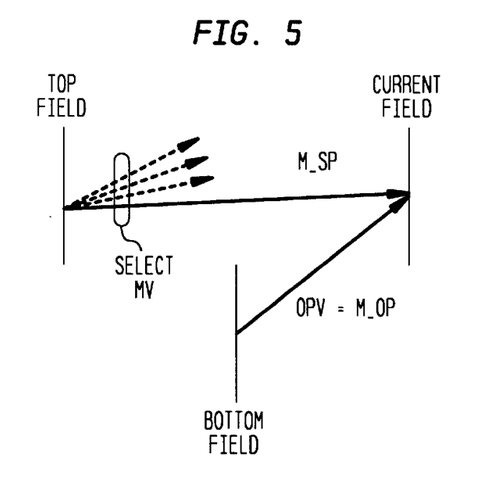
FIG. 5 illustrates dual prime motion estimation in accordance with a second exemplary embodiment of the invention.

FIG. 5 illustrates the operation of a second exemplary embodiment of the dual prime motion estimator 20 in accordance with the invention. The opposite-parity vector OPV for a given macroblock of the current field is chosen as the opposite-parity match vector M_OP. The base motion vector MV and delta motion vector DMV are then chosen so that the base motion vector MV for the given macroblock is as close as possible to the same-parity match vector M_SP given that OPV is selected as M_OP and the x and y components of DMV are selected from {−1, 0, 1}. The DMV vector is therefore determined such that the resulting MV vector is selected from a group of potential MV shown generally by dashed arrows in FIG. 5. The determination of the MV and DMV vectors depends on a comparison of the various MV vectors which may be generated in accordance with Equations (1) and (2) above using the DMV component values of {−1, 0, 1} given that OPV is selected as M_OP.

The following example illustrates the operation of the dual prime motion estimator 20 in accordance with the second exemplary embodiment of the present invention. The same-parity match vector M_SP, opposite-parity match vector M_OP and e values are given by: M_SP =(−1, 3), M_OP =(1, 4) and e=1. As described above, the motion estimator 20 sets OPV =M_OP =(1, 4). The following is a list of all MVx/DMVx pairs which produce an OPVx value of 1:

| MVx | DMVx |
|---|---|
| −1 | 1 |
| 0 | 1 |
| 1 | 1 |
| 2 | 0 |
| 3 | 0 |
| 4 | −1 |
| 5 | −1 |

Note that if MVx is less than or equal to −2, then OPVx will be less than or equal to 0, and if MVx is greater than or equal to 6, OPVx will be greater than or equal to 2. The following is a list of all MVy/DMVy pairs which produce an OPVy value of 4:

| MVy | DMVy |
|---|---|
| 4 | 1 |
| 5 | 1 |
| 6 | 0 |
| 7 | 0 |
| 8 | −1 |
| 9 | −1 |

Note that if MVy is less than or equal to 3, then OPVy will be less than or equal to 3, and if MVy is greater than or equal to 10, OPVy will be greater than or equal to 5. From the above it can be seen that the MVx/DMVx pair with MVx closest to M_SPx is MVx=−1, DMVx=−1, and the MVy/DMVy pair with MVy closest to M_SPy is MVy=4, DMVy=−1. he dual prime motion estimator 20 therefore chooses MV=(−1, 4) and DMV=(1, 1).

Equation (1) above indicates that MVx is an integer in the interval [2*OPVx+Lx, 2*OPVx+Ux], where Lx=−3 if OPVx≦1 and −2 otherwise and Ux=3 if OPVx≧−1 and 2 otherwise. The Lx and Ux values depend on OPVx because MVx divided by 2 is rounded toward zero in computing OPVx, and whether the result is rounded up or down depends on the sign of MVx. Similarly, Equation (2) above indicates that MVy is an integer in the interval [2*OPVy−2*e+Ly, 2*OPVy−2*e+Uy], where Ly=−3 if OPVy−2*e<1 and −2 otherwise and Uy=3 if OPVx−2*e>−1 and 2 otherwise. In the previous example, Lx=−3, Ux=3, Ly=−2 and Uy=3, so MVx is chosen from the range [2*1−3, 2*1+3]= [−1, 5] and MVy is chosen from [2*4−2−2, 2*4−2+3]=[4, 9]. Although this example illustrates the operation of the second embodiment of the present invention by examining all combinations of MV and DMV, all combinations of MV and DMV do not have to be examined explicitly to determine which produces an MV as close as possible to M_SP given that OPV is set equal to M_OP and each component of DMV is in the set {−1, 0, 1}. Instead, the appropriate MV and DMV values can be computed in the manner described below.

The following pseudocode illustrates the generation of the MV and DMV motion vectors for a given macroblock in the second exemplary embodiment of the dual prime motion estimator 20:

OPVx=*M_OPx*

OPVy=*M_OPy* if (*OPVx*<1)Lx=−3

```
else Lx=-2 if (OPVx>-1)Ux=3 else Ux=2 if (OPVy-e<1)Ly=-3 else Ly=-2 if (OPVy-e>-1)Uy=3 else Uy=2 if (M-SPx>2*OPVx+Ux)MVx=2*OPVx+Ux else if (M_SPx<2*OPVx+Lx)MVx=2*OPVx+Lx else MVx=M_OPx if (M_SPy>2*(OPVy-e)+Uy) MVy=2*(OPVy-e)+Uy else if (M_SPy<2*(OPVy-e)+Ly)MVy=2*(OPVy-e)+Ly else MVy=M_OPy DMVx=OPVx-MVx/2

DMVy=OPVy-e-MVy/2
```

A third exemplary embodiment of the dual prime motion estimator 20 of FIG. 2 operates as follows. The motion estimator 20 determines E_SP as a measure of the error between the current macroblock and the reference macroblock of the same-parity previous field used to generate M_SP, and determines E_OP as a measure of the error between the current macroblock and the reference macroblock of the opposite-parity previous field used to generate M_OP. The motion estimator 20 may make the error measurements E_SP and E_OP using techniques such as mean absolute error or mean square error. The motion estimator 20 then compares E_OP to the sum of E_SP and a constant BIAS_SP. If E_OP>E_SP+BIAS_SP, the dual prime motion estimator 20 uses the method of the first embodiment described above to compute MV and DMV. Otherwise, the dual prime motion estimator 20 uses the method of the second embodiment described above. The constant BIAS_SP may be chosen in the range between about ±1/32 times the maximum possible value of E_SP, and its value may vary depending on factors such as bit rate. Advantages of this third embodiment over the first and second embodiments include potentially higher quality video after decompression, because the more reliable of M_SP and M_OP is used more heavily in determining the values of MV and DMV.

It should be understood that the foregoing description is merely illustrative of the invention. Numerous alternative embodiments within the scope of the appended claims will be apparent to those of ordinary skill in the art. For example, the dual prime motion estimation of the present invention may be applied to frame pictures by generating motion vectors for a reference top field predicting a current top field (M_TT), a reference bottom field predicting a current top field (M_BT), a reference top field predicting a current bottom field (M_TB) and a reference bottom field predicting a current bottom field (M_BB), along with associated error measures E_TT, E_BT, E_TB and E_BB. The dual prime motion vectors are then selected using these values. In one possible embodiment, MV may be selected as the average of M_TT and M_BB, and DMV may be chosen to minimize the differences between OPV and M_BT, M_TB.

The claimed invention is:

1. A method for performing motion estimation on a video picture a video sequence, the picture including a plurality of blocks of pixel data, the method comprising the steps of:
   generating first and second match vectors for a current block of a current picture of the video sequence, the first and second match vectors indicating displacement of the current block from respective first and second reference blocks of respective first and second reference pictures and
   generating from the first and second match vectors a base motion vector and a delta motion vector, such that the delta motion vector is determined as a function of at least one of the first and second match vectors the base motion vector and delta motion vector indicating resultant displacement of the current block from the respective first and second reference blocks,
   wherein the step of generating from the first and second match vectors a base motion vector and a delta motion vector further includes the steps of:
      setting the base motion vector equal to the second match vector generated from the previous same-parity field; and
      selecting the delta motion vector such that an opposite parity motion vector to be generated by a decoder is as close as possible to the first match vector generated from the previous opposite-parity field given that the base motion vector is equal to the second match vector.

2. The method of claim 1, wherein the current picture is a field of the video sequence, the first reference picture is a previous opposite-parity field and the second reference picture is a previous same-parity field.

3. The method of claim 2 wherein the step of generating from the first and second match vectors a base motion vector and a delta motion vector further includes the steps of:
   setting an opposite parity motion vector to be generated by a decoder equal to the first match vector generated from the previous opposite-parity field; and
   selecting the base motion vector and the delta notion vector such that the base motion vector is as close as possible to the second match vector generated from the previous same-parity field given that the opposite parity motion vector is set equal to the first match vector and that vertical and horizontal components of the delta motion vector are selected from the set {-1, 0, 1}.

4. A method for performing motion estimation on a video picture of a video sequence, the picture including a plurality of blocks of pixel data, the method comprising the steps of:
   generating first and second match vectors for a current block of a current picture of the video sequence, the first and second match vectors indicating displacement of the current block from respective first and second reference blocks of respective first and second reference pictures, wherein the current picture is a field of the video sequence, the first reference picture is a previous opposite-parity field and the second reference picture is a previous same-parity field; and
   generating from the first and second match vectors a base motion vector and a delta motion vector such that the delta motion vector is determined as a function of at least one of the first and second match vectors, the base motion vector and delta motion vector indicating resultant displacement or the current block from the respective first and second reference blocks,
   wherein the step of generating from the first and second match vectors a base motion vector and a delta motion vector further includes the steps of:

setting the base motion vector equal to the second match vector generated from the previous same-parity field; and selecting the delta motion vector such that an opposite parity motion vector to be generated by a decoder is as close as possible to the first match vector generated from the previous opposite-parity field given that the base motion vector is equal to the second match vector and that vertical and horizontal components of the delta motion vector are selected from the set $\{-1, 0, 1\}$.

5. A method for performing motion estimation on a video picture of a video sequence, the picture including a plurality of blocks of pixel data, the method comprising the steps of:

generating first and second match vectors for a current block of a current picture of the video sequence, the first and second match vectors indicating displacement of the current block from respective first and second reference blocks of respective first and second reference pictures, wherein the current picture is a field of the video sequence, the first reference picture is a previous opposite-parity field and the second reference picture is a previous same-parity field; and generating from the first and second match vectors a base motion vector and a delta motion vector, such that the delta motion vector is determined as a function of at least one of the first and second match vectors, the base motion vector and delta motion vector indicating resultant displacement of the current block from the respective first and second reference blocks, wherein the step of generating from the first and second match vectors a base motion vector and a delta motion vector further includes the steps of:

setting an opposite parity motion vector to be generated by a decoder equal to the first match vector generated from the previous opposite-parity field; and selecting the base motion vector and the delta motion vector such that the base motion vector is as close as possible to the second match vector generated from the previous same-parity field given that the opposite parity motion vector is set equal to the first match vector.

6. A method for performing motion estimation on a video picture of a video sequence, the picture including a plurality of blocks of pixel data, the method comprising the steps of:

generating first and second match vectors for a current block of a current picture of the video sequence, the first and second match vectors indicating displacement of the current block from respective first and second reference blocks of respective first and second reference pictures, wherein the current picture is a field of the video sequence, the first reference picture is a previous opposite-parity field and the second reference picture is a previous same-parity field;

generating from the first and second match vectors a base motion vector and a delta motion vector, such that the delta motion vector is determined as a function of at least one of the first and second match vectors, the base motion vector and delta motion vector indicating resultant displacement of the current blocks from the respective first and second reference blocks and determining whether to set the base motion vector equal to the second match vector generated from the previous same-parity field or to set an opposite parity motion vector equal to the first match vector, based on the result of an error measure between the current block and at least one of the first and second reference blocks.

7. The method of claim 6 further including the steps of:

generating a first error measure indicative of an error between the current block and the first reference block;

generating a second error measure indicative of an error between the current block and the second reference block;

setting the base motion vector equal to the second match vector generated from the previous same-parity field if the first error measure is greater than the second error measure plus a predetermined constant; and setting an opposite parity motion vector to be generated by a decoder equal to the first match vector if the first error measure is less than the second error measure plus the predetermined constant.

8. A method for performing motion estimation on a video picture of a video sequence, the picture including a plurality of blocks of pixel data, the method comprising the steps of;

generating first and second match vectors for a current block of a current picture of the video sequence, the first and second match vectors indicating displacement of the current block from respective first and second reference blocks of respective first and second reference pictures, wherein the current picture is a field of the video sequence, the first reference picture is a previous opposite-parity field and the second reference is a previous same-parity field; and generating from the first and second match vectors a base motion vector and a delta motion vector, such that the delta motion vector is determined as a function of at least one of the first and second match vectors, the base motion vector and delta motion vector indicating resultant displacement of the current block from respective first and second reference blocks, wherein the step of generating from the first and second match vectors a base motion vector and a delta motion vector further includes the steps of:

setting the base motion vector equal to the second match vector generated from the previous same-parity field;

setting a horizontal component of the delta motion vector equal to positive one if a horizontal component of the first match vector is greater than the closest integer to a horizontal component of the base motion vector divided by two that is no larger than the horizontal component of the base motion vector divided by two;

setting the horizontal component of the delta motion vector equal to negative one if the horizontal component of the first match vector is less than the closest integer to the horizontal component of the base motion vector divided by two that is not larger than the horizontal component of the base motion vector divided by two; and setting the horizontal component of the delta motion vector equal to zero if the horizontal component of the first match vector is equal to the closest integer to the horizontal component of the base motion vector divided by two that is not larger than the horizontal component of the base motion vector divided by two.

9. An apparatus for performing motion estimation on a video picture of a video sequence, the picture including a plurality of blocks of pixel data, the apparatus comprising:

a first motion vector generator for generating first and second match vectors for a current block of a current picture of the video sequence, the first and second match vapors indicating displacement of the current block from respective first and second reference blocks of respective first and second reference pictures:

a second motion vector generator for receiving the first and second match vectors from the first motion vector generator, the second motion vector generator generating from the first and second match vectors a base motion vector and a delta motion vector such that the delta motion vector is determined as a function of at least one of the first and second match vectors the base motion vector and delta motion vector indicating resultant displacement of the current block from the respective first and second reference blocks; and a mode decider having inputs connected to receive the first and second match vectors from the first motion vector generator and the base and delta motion vectors from the second motion vector generator, and outputs corresponding to selected vectors corresponding to a particular estimation mode.

10. The apparatus of claim 9 wherein the current picture is a field of the video sequence, the first reference picture is a previous opposite-parity field and the second reference picture is a previous same-parity field.

11. An apparatus for performing motion estimation on a video picture of a video sequence, the picture including a plurality of blocks of pixel data, the apparatus comprising:

a first motion vector generator for generating first and second match vectors for a current block of a current picture of the video sequence, the first and second match vectors indicating displacement of the current block from respective first and second reference blocks of respective first and second reference pictures; and a second motion vector generator for receiving the first and second match vectors from the first motion vector generator, the second motion vector generator generation from the first and second match vectors a base motion vector and a delta motion vector, such that the delta motion vector is determined as a function of at least one of the first and second match vectors, the base motion vector and delta motion vector indicating resultant displacement of the current block from the respective first and second reference blocks, wherein the second motion vector generator generates the base motion vector and delta motion vector by setting the base motion vector equal to the second match vector generated from the previous same-parity field, and selecting the delta motion vector such that an opposite parity motion vector to be generated by a decoder is as close as possible to the first match vector generated from the previous opposite-parity field given that the base motion vector is equal to the second match vector.

12. An apparatus for performing motion estimation on a video picture of a video sequence, the picture including a plurality of blocks of pixel data, the apparatus comprising:

a first motion vector generator for generating first and second match vectors for a current block of a current picture of the video sequence, the first and second match vectors indicating displacement of the current block from respective first and second reference blocks of respective first and second reference pictures; and a second motion vector generator for receiving the first and second match vectors from the first motion vector generator, the second motion vector generator generating from the first and second match vectors a base motion vector and a delta motion vector, such that the delta motion vector is determined as a function of at least one of the first and second match vectors, the base motion vector and delta motion vector indicating resultant displacement of the current block from the respective first and second reference blocks, wherein the second motion vector generator generates the base motion vector and delta motion vector by setting the base motion vector equal to the second match vector generated from the previous same-parity field, and selecting the delta motion vector such that an opposite parity motion vector to be generated by a decoder is as close as possible to the first match vector generated from the previous opposite-parity field given that the base motion vector is equal to the second match vector and that vertical and horizontal components of the delta motion vector are selected from the set $\{-1, 0, 1\}$.

13. An apparatus for performing motion estimation on a video picture of a video sequence, the picture including a plurality of blocks of pixel data, the apparatus comprising:

a first motion vector generator for generating first and second match vectors for a current block of a current picture of the video sequence, the first and second match vectors indicating displacement of the current block from respective first and second reference blocks of respective first and second reference pictures; and a second motion vector generator for receiving the first and second match vectors from the first motion vector generator, the second motion vector generator generating from the first and second match vectors a base motion vector and a delta motion vector, such that the delta motion vector is determined as a function of at least one of the first and second match vectors, the base motion vector and delta motion vector indicating resultant displacement of the current block from the respective first and second reference blocks, wherein the second motion vector generator generates the base motion vector and delta motion vector by setting an opposite parity motion vector to be generated by a decoder equal to the first match vector generated from the previous opposite-parity field, and selecting the base motion vector and the delta motion vector such that the base motion vector is as close as possible to the second match vector generated from the previous same-parity field given that the opposite parity motion vector is set equal to the first match vector.

14. An apparatus for performing motion estimation on a video picture of a video sequence, the picture including a plurality of blocks of pixel data, the apparatus comprising:

a first motion vector generator for generating first and second match vectors for a current block of a current picture of the video sequence, the first and second match vectors indicating displacement of the current block from respective first and second reference blocks of respective first and second reference pictures; and a second motion vector generator for receiving the first and second match vectors from the first motion vector generator, the second motion vector generator generating from the first and second match vectors a base motion vector and a delta motion vector, such that the delta motion vector is determined as a function of at least one of the first and second match vectors, the base motion vector and delta motion vector indicating resultant displacement of the current block from the respective first and second reference blocks, wherein the second motion vector generator generates the base motion vector and delta motion vector by setting an opposite parity motion vector to be generated by a decoder equal to the first match vector generated from the previous opposite-parity field, and selecting the base motion vector and the delta motion vector such that the base notion vector is as close as possible to the second match vector generated from the previous same-parity field given that the opposite parity motion vector is set equal to the first match vector and that vertical and horizontal components of the delta motion vector are selected from the set $\{-1, 0, 1\}$.

15. An apparatus for performing motion estimation on a video picture of a video sequence, the picture including a plurality of blocks of pixel data, the apparatus comprising:
   a first motion vector generator for generating first and second match vectors for a current block of a current picture of the video sequence, the first and second match vectors indicating displacement of the current block from respective first and second reference blocks of respective first and second reference pictures; and
   a second motion vector generator for receiving the first and second match vectors from the first motion vector generator, the second motion vector generator generating from the first and second match vectors a base motion vector and a delta motion vector, such that the delta motion vector is determined as a function of at least one of the first and second match vectors, the base motion vector and delta motion vector indicating resultant displacement of the current block from the respective first and second reference blocks wherein the second motion vector generator is further operative to determine whether to set the base motion vector equal to the second match vector generated from the previous same-parity field or to set an opposite parity motion vector equal to the first match vector, based on the result of an error measure between the current block and at least one of the first and second reference blocks.

16. The apparatus of claim 15 wherein the second motion vector generator is further operative to generate a first error measure indicative of an error between the current block and the first reference block, generate a second error measure indicative of an error between the current block and the second reference block, set the base motion vector equal to the second match vector generated from the previous same-parity field if the first error measure is greater than the second error measure plus a predetermined constant, and set an opposite parity motion vector to be generated by a decoder equal to the first match vector if the first error measure is less than the second error measure plus the predetermined constant.

17. An apparatus for performing motion estimation on a video picture of a video sequence, the picture including a plurality of blocks of pixel data, the apparatus comprising:
   first motion vector generator for generating first and second match vectors for a current block of a current picture of the video sequence, the first and second match vectors indicating displacement of the current block from respective first and second reference blocks of respective first and second reference pictures; and
   a second motion vector generator for receiving the first and second match vectors from the first motion vector generator, the second motion vector generator generating from the first and second match vectors a base motion vector and a delta motion vector, such that the delta motion vector is determined as a function of at least one of the first and second match vectors, the base motion vector and delta motion vector indicating resultant displacement of the current block from the respective first and second reference blocks, wherein the second motion vector generator generates the base motion vector and delta motion vector by setting the base motion vector equal to the second match vector generated from the previous same-parity field, setting a horizontal component of the delta motion vector equal to positive one if a horizontal component of the First match vector is greater than the closest integer to a horizontal component of the base motion vector divided by two that is no larger than the horizontal component of the base motion vector divided by two, setting the horizontal component of the delta motion vector equal to negative one if the horizontal component of the first match vector is less than the closest integer to the horizontal component of the base motion vector divided by two that is not larger than the horizontal component of the base motion vector divided by two, and setting the horizontal component of the delta notion vector equal to zero if the horizontal component of the first match vector is equal to the closest integer to the horizontal component of the base motion vector divided by two that is not larger than the horizontal component of the base motion vector divided by two.

18. A method of encoding a video picture sequence to generate a compressed video bit stream, the method comprising the steps of:
   receiving the video picture sequence from a video source, each of the video pictures including a plurality of blocks of pixel data;
   generating first and second match vectors for a current block of a current picture of the video sequence, the first aid second match vectors indicating displacement of the current block from respective first and second reference blocks of respective first and second reference pictures;
   generating from the first and second match vectors a base motion vector and a delta motion vector, such that the delta motion vector is determined as a function of at least one of the first and second match vectors, the base motion vector and delta motion vector indicating resultant displacement of the current block from the respective first and second reference blocks;
   performing spatial compression operations on the blocks of pixel data of the video pictures of the video picture sequence to generate spatially-compressed blocks; and
   utilizing the base and delta motion vectors and the spatially-compressed blocks to generate the compressed video bit stream,
   wherein the step of generating from the first and second match vectors a base motion vector and a delta motion vector further includes the steps of:
   setting the base motion vector equal to the second match vector generated from the previous same-parity field; and
      selecting the delta motion vector such that an opposite parity motion Vector to be generated by a decoder is as close as possible to the first match vector generated from the previous opposite-parity field given that the base motion vector is equal to the second match vector.

19. The method of claim 18 wherein the current picture is a field of the video sequence, the first reference picture is a previous opposite-parity field and the second reference picture is a previous same-parity field.

20. A method of encoding a video picture sequence to generate a compressed video bit stream, the method comprising the steps of:

receiving the video picture sequence from a video source, each of the video pictures including a plurality of blocks of pixel data;

generating first and second match vectors for a current block of a current picture of the video sequence, the first and second match vectors indicating displacement of the current block from respective first and second reference blocks of respective first and second reference pictures;

generating from the first and second match vectors a base motion vector and a delta motion vector, such that the delta motion vector is determined as a function of at least one of the first and second match vectors, the base motion vector and delta motion vector indicating resultant displacement of the current block from the respective first and second reference blocks;

performing spatial compression operations on the blocks of pixel data of the video pictures of the video picture sequence generate spatially-compressed blocks; and utilizing the base and delta motion vectors and the spatially-compressed blocks to generate the compressed video bit stream, wherein the step of generating from the first and second match vectors a base motion vector and a delta motion vector further includes the steps of.

setting an opposite parity motion vector to be generated by a decoder equal the first match vector generated from the previous opposite-parity field; and selecting the base motion vector and the delta motion vector such that the base motion vector is as close as possible to the second match vector generated from the previous same-parity field given that the opposite parity motion vector is set equal to the first match vector.

21. A video encoder for encoding a video picture sequence to generate a compressed video bit stream, the encoder comprising:

a memory for storing video pictures of the video picture sequence, each of the video pictures including a plurality of blocks of pixel data;

a motion estimator for performing motion estimation operations on the video pictures of the video sequence, the motion estimator generating first and second match vectors for a current block of a current picture of the video sequence, the first and second match vectors indicating displacement of the current block from respective first and second reference blocks of respective first and second reference pictures, and generating from the first and second match vectors abase motion vector and delta motion vector, such that the delta motion vector is determined as a function of at least one of the first and second match vectors, wherein the base motion vector and delta motion vector indicating resultant displacement of the current block from the respective first and second reference blocks; and a processor for performing spatial compression operations on the blocks of pixel data of the video pictures of the video picture sequence to thereby generate spatially-compressed blocks, wherein the processor utilizes the base and delta motion vectors and the spatially-compressed blocks to generate the compressed video bit stream, wherein the motion estimator generates the base motion vector and delta motion vector by setting the base motion vector equal to the second match vector generated from the previous same-parity field, and selecting the delta motion vector such that an opposite parity motion vector to be generated by a decoder is as close as possible to the first match vector generated from the previous opposite-parity field given that the base motion vector is equal to the second match vector.

22. The apparatus of claim 21 wherein the current picture is a field of the video sequence, the first reference picture is a previous opposite-parity field and the second reference picture is a previous same-parity field.

23. A video encoder encoding a video picture sequence to generate a compressed video bit stream, the encoder comprising:

a memory for storing video pictures of the video picture sequence, each of the video pictures including a plurality of blocks of pixel data;

a motion estimator for performing motion estimation operations on the video pictures of the video sequence, the motion estimator generating first and second match vectors for a current block of a current picture of the video sequence, the first and second match vectors indicating displacement of the current block from respective first and second reference blocks of respective first and second reference pictures, and generating from the first and second match vectors a base motion vector and a delta motion vectors such that the delta motion vector is determined as a function of at least one of the first and second match vectors wherein the base motion vector and delta motion vector indicating resultant displacement of the current block from the respective first and second reference blocks; and a processor for performing spatial compression operations on the blocks of pixel data of the video pictures of the video picture sequence to thereby generate spatially-compressed blocks wherein the processor utilizes the base and delta motion vectors and the spatially-compressed blocks to generate the compressed video bit stream, wherein the motion estimator generates the base motion vector and delta motion vector by setting an opposite parity motion vector to be generated by a decoder equal to the first match vector generated from the previous opposite-parity field, and selecting the base motion vector and the delta motion vector such that the base motion vector is as close as possible to the second match vector generated from the previous same-parity field given that the opposite parity motion vector is set equal to the first match vector.

24. A method of processing a video picture sequence, the method comprising the steps of:

receiving the video picture sequence from a video source, each of the video pictures including a plurality of blocks of pixel data;

generating first and second match vectors for a current block of a current picture of the video sequence, the first and second match vectors indicating displacement of the current block from respective first and second reference blocks of respective first and second reference pictures;

generating from the first and second match vectors a base motion vector and a delta motion vector, such that the delta motion vector is determined as a function of at least one of the first and second match vectors, the base motion vector and delta motion vector indicating resultant displacement of the current block from the respective first and second reference blocks;

performing spatial compression operations on the blocks of pixel data of the video pictures of the video picture sequence to generate spatially-compressed blocks; and utilizing the base and delta motion vectors and the spatially-compressed blocks to generate a compressed video bit stream, wherein the step of generating from the first and second match vectors a base motion vector and a delta motion vector further includes the steps of;

setting the base motion vector equal to the second match vector generated from the previous same-parity field; and selecting the delta motion vector such that an opposite parity motion vector to be generated by a decoder is as close as possible to the first match vector generated from the previous opposite-parity field given that the base motion vector is equal to the second match vector.

25. The method claim 24 further comprising the step of storing the compressed video bit stream.

26. The method of claim 24, further comprising the step of decoding the compressed video bit stream.

27. The method of claim 24, further comprising the step of transmitting the compressed video bit stream.

28. An apparatus for processing a video picture sequence, the apparatus comprising:

a memory for storing video pictures of the video picture sequence, each of the video pictures including a plurality of blocks of pixel data;

a motion estimator for performing motion estimation operations on the video pictures of the video sequence, the motion estimator generating first and second match vectors for a current block of a current picture of the video sequence the first and second match vectors indicating displacement of the current block from respective first and second reference blocks of respective first and second reference pictures, and generating from the first and second match vectors a base motion vector and a delta motion vector, such that the delta motion vector is determined as a function of at least one of the first and second match vectors, wherein the base motion vector and delta motion vector indicating displacement of the current block from the respective first and second reference blocks; a a processor for performing spatial compression operations on the blocks of pixel data of the video pictures of the video picture sequence to Thereby generate spatially-compressed blocks, wherein the processor utilizes the base and delta motion vectors and the spatially-compressed blocks to generate a compressed video bit stream, wherein the motion estimator generates the base motion vector and delta motion vector by setting the base motion vector equal to the second match vector generated from the previous same-parity field, and selecting the delta motion vector such that an opposite parity motion vector to be generated by a decoder is as close as possible to the first match vector generated from the previous opposite-parity field given that the base motion vector is equal to the second match vector.

29. The apparatus of claim 28, further comprising a storage device for storing the compressed video bit stream.

30. The apparatus of claim 28, further comprising a decoder for decoding the compressed video bit stream.

31. The Apparatus of claim 28 further comprising a transmitter for transmitting the compressed video bit stream.

32. A method of processing a video picture sequence, the method comprising the steps of:

receiving the video picture sequence from a video source, each of the video pictures including a plurality of blocks of pixel data;

generating first and second match vectors for a current block of a current picture of the video sequence, the first and second match vectors indicating displacement of the current block from respective first and second reference blocks of respective first and second reference pictures;

generating from the first and second match vectors a base motion vector and a delta motion vector, such that the delta motion vector is determined as a function of at least one of the first and second match vectors, the base motion vector and delta motion vector indicating resultant displacement of the current block from the respective first and second reference blocks;

performing spatial compression operations on the blocks of pixel data of the video pictures of the video picture sequence to generate spatially-compressed blocks;

utilizing the base and delta motion vectors and the spatially-compressed blocks to generate a compressed video bit stream; and transmitting the compressed video bit stream, wherein the step of generating from the first and second match vectors a base motion vector and a delta motion vector further includes the steps of:

setting an opposite parity motion vector to be generated by a decoder equal to the first match vector generated from the previous opposite-parity field; and selecting the base motion vector and the delta motion vector such that the base motion vector is as close as possible to the second match vector generated from the previous same-parity field given that the opposite parity motion vector is set equal to the first match vector.

33. The method of claim 32, further comprising the step of transmitting the compressed video bit stream.

34. The method of claim 32, further comprising the step of storing the compressed video bit stream.

35. The method of claim 32, further comprising the step of decoding the compressed video bit stream.

36. An apparatus for processing a video picture sequence, the apparatus comprising:

a memory for storing video pictures of the video picture sequence, each of the video pictures including a plurality of blocks of pixel data;

a motion estimator for performing motion estimation operations on the video pictures of the video sequence, the motion estimator generating first and second match vectors for a current block of a current picture of the video sequence, the first and second match vectors indicating displacement of the current block from respective first and second reference blocks of respective first and second reference pictures, and generating from the first and second match vectors a base motion vector and a delta motion vector, such that the delta motion vector is determined as a function of at least one of the first and second match vectors, wherein the base motion vector and delta motion vector indicating displacement of the current block from the respective first and second reference blocks; and a processor for performing spatial compression operations on the blocks of pixel data of the video pictures of the video picture sequence to thereby generate spatially-compressed blocks, wherein the processor utilizes the base and delta motion vectors and the spatially-compressed blocks to generate a compressed video bit stream, wherein the motion estimator generates the base motion vector and delta motion vector by setting an opposite parity motion vector to be generated by a decoder equal to the first match vector generated from the previous opposite-parity field, and selecting the base motion vector and the delta motion vector such that the base motion vector is as close as possible to the second match vector generated from the previous same-parity field given that the opposite parity motion vector is set equal to the first match vector.

37. The Apparatus of claim 36 further comprising a transmitter for transmitting the compressed video bit stream.

38. The apparatus of claim 36, further comprising a storage device for storing the compressed video bit stream.

39. The apparatus of claim 36, further comprising a decoder for decoding the compressed video bit stream.

* * * * *